Patented Nov. 21, 1950

2,530,488

UNITED STATES PATENT OFFICE 2,530,488

TRIALKYLAMINE SALTS OF PENICILLIN AND PROCESS FOR THE PURIFICATION OF PENICILLIN

Neil E. Rigler, Glen Rock, N. J., assignor to Heyden Chemical Corporation, New York, N. Y., a corporation of Delaware No Drawing. Application July 12, 1945,
Serial No. 604,724

5 Claims. (Cl. 260—302)

1

The present invention relates to antibiotic substances, specifically penicillins, and processes for the purification of said substances. In one of its more specific embodiments, the invention relates to a process for the purification of penicillin G and to trialkylamine salts of penicillin G.

There are a number of antibiotic substances which are referred to as penicillin. These substances, which have not as yet been synthesized, are products of the fermentative action or growth of various species of Penicillium organisms in carbohydrate-containing media and differ from each other, so far as now known, in chemical composition. The empirical composition of many of these compounds is known but the structural composition is, however, still a matter of conjecture. The identification and constitution of the individual chemical compounds contained in the various penicillins is still under investigation; the problem is complicated by the difficulty of isolating pure or substantially pure individual compounds from the complex mixtures and by the complexity of the chemical structures of the individual compounds. It is known that penicillins are carboxylic acids and have some common structural features. Several penicillins have heretofore been obtained in pure or crystalline form; one such penicillin is that designated penicillin G. Penicillin G is obtainable in a form having a substantial degree of freedom from other penicillins by the well-known process of submerged fermentation of corn-steep liquor with certain strains of *Penicillium notatum*. Penicillin G has an empirical formula of $C_{16}H_{18}O_4N_2S$ which may be represented by the following skeletal structure:

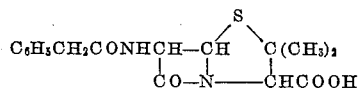

Penicillins made by other processes and with other species of Penicillium organisms may contain penicillin G as well as other chemical compounds known as penicillins and having structures related to penicillin G.

Heretofore penicillin G has been purified by various methods and, by repeated purification in accordance with these methods, has been obtained in substantially pure crystalline form. These purification methods include chromatographic adsorption, for example, by means of a silica gel-phosphate buffer mixture having a pH of approximately 6.5. It has also been purified by fractional extraction of chloroform solutions of the crude penicillin with dilute sodium hydroxide solutions. Penicillin G has been obtained in crystalline form by extracting a purified sodium salt of the penicillin with anhydrous acetone, which removes substances that prevent the sodium salt from crystallizing. These purification processes require many operations and careful control to provide a pure crystalline material; furthermore, the starting material must be relatively pure and the yields of crystalline material are low.

It is an object of the present invention to provide a process for the recovery and isolation of penicillins, particularly penicillin G, in substantially pure crystalline form from relatively impure penicillins. A further object of the invention is to provide derivatives of such penicillins which are readily separable from the impurities naturally occurring in penicillins produced by fermentation. A further object of the invention is to provide derivatives which are characterized by a much more pronounced tendency to crystallize in pure form than the salts and other derivatives of penicillin that were heretofore known. Still another object of the invention is to provide such penicillin derivatives which are readily convertible to the pure penicillin or its sodium salt. Other objects and advantages of the invention, some of which are referred to hereinafter more specifically, will be apparent to those skilled in the art to which the invention pertains.

I have discovered that penicillin G forms, with triethylamine and similar symmetrical trialkylamines, salts that are characterized by a great tendency to crystallize and that are readily separated from impurities or substances that are normally present in crude products produced by fermentation or mold growth. Although the triethylamine salt has a well-defined crystalline structure and crystallizes much more readily than the free penicillin or its sodium salt, its melting point is not as sharp as that of the sodium salt.

In the practice of the process of the present invention for the purification and crystallization of penicillin, the fermentation liquor, for example, from a conventional submerged fermentation of corn-steep liquor with an organism such as *Penicillium notatum* N. R. R. L. No. 832, is cleared of mycelium growth or mat. The clear liquor is then acidified with phosphoric acid or sulfuric acid to a pH of 2 or thereabout and is then extracted with amyl acetate or other suitable solvent. The amyl acetate extract is then extracted with an aqueous buffer solution such as a solution of disodium phosphate until the combined extracts have a pH of approximately 7.0. The combined buffer solution extracts are acidified to a pH of approximately 2.0 and extracted with chloroform, after which the chloroform extract is washed or extracted with an aqueous sodium hydroxide or sodium bicarbonate or other alkaline solution to a pH of approximately 7.0, that is, until the combined alkali extracts have a pH of 7.0. The foregoing extractions are similar to the conventional treatments employed in the production of penicillin. All of said extractions are preferably conducted at a temperature of approximately 5° C. or lower.

To the foregoing aqueous extract is added ether, or other suitable solvent as referred to hereinafter, in such amount that after extraction the ether solution will contain from approximately 3 to approximately 10 milligrams (5000 to 15,000 Oxford units) of penicillin per milliliter. The mixture is maintained at a temperature within the range of approximately 0° to approximately 5° C. and is then acidified with phosphoric acid or sulfuric acid to a pH of approximately 2.0. The ether extract is separated from the aqueous phase and is then dried by contact with a neutral desiccant such as sodium sulfate or by freezing out the water.

To the dried ether solution containing from approximately 3 to approximately 10 mg. (5,000 to 15,000 Oxford units) of penicillin per ml. at approximately 0° to approximately 5° C. is added slowly a solution of triethylamine in ether containing approximately 10% by weight of triethylamine. Upon the gradual addition of the triethylamine solution, an oil, which is generally brown-colored, separates. Additional triethylamine solution is added to the ether solution until sufficient oil, as determined by prior experience, has been separated. The ether solution is decanted from the oil and, to the ether solution containing penicillin that is thus obtained, is added an additional quantity of triethylamine solution and the triethylamine salt of penicillin is allowed to crystallize, preferably after seeding with crystals obtained from a prior batch. The oil, which still contains some penicillin, may be discarded or collected and treated for recovery of penicillin.

Approximately 0.1 milliliter of 10% triethylamine solution is required for each 100,000 Oxford units (60 mg.) of penicillin for crude penicillin assaying approximately 500 units per mg. This amount may be used as a guide in estimating the amount of triethylamine that is to be used to effect a particular separation. The amount is variable with the purity of the penicillin, as is obvious. It is preferably not to add sufficient triethylamine to precipitate all the penicillin since the last material to come down is generally a light-colored oil. The quantity of triethylamine to use may also be approximated by determination of the pH of the resulting solution, for example, by means of colorimetric indicators. Other conventional methods may also be adapted for estimating and preventing the addition of an excess of triethylamine solution.

The triethylamine or other trialkylamine may be added in the pure form or in solution in solvents other than ether. Triethylamine, which has a boiling point of 3.5° C., is preferably used in solution.

The crystals of triethylamine salt of penicillin G which are thus obtained and which are substantially free from oil or other impurities are separated by filtration or other suitable means and are washed with acetone containing approximately 1.5% by weight of water or with 1,4-dioxane or n-butanol or other suitable washing liquid. In this respect it should be noted that anhydrous acetone is not a satisfactory washing medium since it does not dissolve either the crystals or the oil. Carbon disulfide, pyridine, methyl ethyl ketone, methylcyclohexane and nitroethane, which also do not dissolve either the crystals or the oil, are also unsatisfactory washing media. The washing, if effected with aqueous acetone, is preferably conducted at a temperature of approximately −10° C.

The washed crystals are then rinsed with ether and dried, preferably in a vacuum desiccator at a temperature not in excess of approximately 50° C., or by other suitable means. The crystals of triethylamine salt of penicillin G as thus obtained begin to melt at a temperature between approximately 100° and approximately 110° C., and melt almost completely at such temperature, but all the crystals do not melt until a higher temperature is reached, generally approximately 138° C. or thereabout. They assay approximately 1365 Oxford units per milligram. When made from a sodium salt of penicillin G having a high degree of purity as a starting material, the crystalline triethylamine salt of penicillin G has been reported to have a sharp melting point of 145°–147° C. Another sample prepared from a penicillin from another source had a melting point of 127°–129° C.

An additional crop of crystals of the triethylamine salt of penicillin G may be obtained from the washings by adding a sufficient amount of ether to produce a slight cloudiness and then allowing crystallization to proceed, for example, for several hours in a refrigerator.

Instead of using ether as a solvent in which to form the trialkylamine salt of penicillin G, various other solvents may be used. Methyl isobutyl ketone (4-methyl-2-pentanone, $(CH_3)_2CHCH_2COCH_3$), amyl acetate, and methyl amyl acetate (4-methylpentyl-2-acetate, 1,3-dimethylbutyl acetate, $$CH_3COOCH(CH_3)CH_2CH(CH_3)_2)$$

are also satisfactory. 1,4-dioxane and n-butyl alcohol are less satisfactory. However, carbon disulfide, pyridine, methyl ethyl ketone, carbon tetrachloride, methylcyclohexane, nitroethane, xylene, chloroform and methylchloroform are not satisfactory because they are not good solvents for penicillin, or are not sufficiently immiscible with water, or possess too great solvent power for the triethylamine salt of penicillin G. It is essential that the solution be substantially dry and maintained cold (5° C. or less) during the precipitation and crystallization.

Crystals of trialkylamine salts of penicillin G may be recrystallized from such solvents as acetone containing 1.5% by weight of water and from n-butyl alcohol and chlorobenzene.

Although the process of the invention is adapted particularly to the purification and isolation of the penicillin known as penicillin G it may be used for the purification and isolation of other penicillins which form crystalline salts with trialkylamines that are readily separated from naturally occurring impurities. It is not necessary to obtain the penicillin from the fermentation liquor according to the general process described hereinabove; the process is applicable to crude products obtained in accordance with other conventional procedures.

The triethylamine salt of penicillin G can be converted readily to other salts, such as the sodium, calcium, and potassium salts of penicillin G. The sodium salt has a sharp melting point of 214.7°–215.0° C. and is characterized by great stability; it can be heated at 150° C. for several hours without decomposition and without any substantial loss in chemotherapeutic effectiveness and potency.

A general method for the conversion of the triethylamine salt of penicillin G to the sodium salt, which can be adapted for the production of other salts, comprises dissolving the salt in water, cooling to 0° C., and acidifying with phosphoric acid or other suitable mineral acid to a pH of approximately 2.0. The aqueous acid solution is then extracted with a solvent for penicillin which is immiscible with water, such as cold ether, chloroform or the like. The extract is then dried and the solution is extracted with a dilute aqueous solution of sodium hydroxide (for example, 0.1 N) in such amount that it is insufficient to convert all of the penicillin to the sodium salt. The extraction is continued with additional amounts of sodium hydroxide solution until the pH of the combined extracts is approximately 6.8. The resulting extract is then frozen and dried in conventional manner. The sodium salt of penicillin G as thus obtained may be recrystallized from aqueous butanol containing 10% by weight of water. The potency of the recrystallized product is approximately 1667 Oxford units per milligram (compared to approximately 1365 for the purified triethylamine salt).

Penicillin G is relatively unstable in solution, either in aqueous solutions or in solution in an organic solvent, hence in the hereindescribed extractions and other operations in which the penicillin is in the form of the acid, the temperatures should be maintained at 5° C. or less. The sodium salt and triethylamine salt of penicillin G are relatively stable in solution and may be handled for relatively long periods at room temperature or at somewhat higher temperatures.

Instead of separating the oil from the penicillin salt in solution, the penicillin salt may be separated from the oil in solution, in accordance with these same principles, and as more specifically described hereinafter in Example 2.

Examples of preferred methods of practicing the process of my invention are as follows:

*Example 1.*—A solution of 15.64 grams of commercial sodium salt of penicillin assaying 337 Oxford units per mg. in 500 ml. of water is diluted to 1 l. with 0.2 M sodium phosphate buffer solution having a pH of 7.0. The solution is cooled to approximately 2° C., acidified with phosphoric acid to a pH of approximately 2.0 and extracted with three equal portions of ether, the total volume of ether used being 900 ml. The ethereal solution is dried by freezing out the water and is then treated with 2 ml. of 10% by weight triethylamine solution in ether, a drop at a time, with vigorous agitation of the flask. The flask is placed in a refrigerator at approximately 5° C. and allowed to stand overnight.

The ethereal solution is subsequently decanted from the layer of brown oil which separates on the bottom of the flask and a few seed crystals are added. Every two or three hours, 2 ml. portions of 10% triethylamine solution are added dropwise with rotation of the flask. At the end of the day there is a considerable quantity of crystals deposited on the inside walls of the flask. Addition of triethylamine solution is continued until no more crystals are formed. The ether is decanted off and the crystals are washed with cold aqueous acetone containing 1.5% water at −10° C. The yield of crystalline triethylamine salt is 1.571 g. and it assays 1390 Oxford units per milligram. This represents a total of 2,180,000 units, or 41% of the original amount.

The acetone wash solution is collected, diluted with ether until a faint turbidity is observed, and is then placed in a refrigerator. At intervals small quantities of ether are added until no more crystals are formed. The crystals are filtered, washed with cold acetone as before, and weigh 0.220 g. This amounts to 306,000 Oxford units or an additional 6% of the original amount.

*Example 2.*—One (1) gram of commercial sodium penicillin assaying 276 Oxford units per mg. is dissolved in 30 ml. of 0.2 M sodium dihydrogen phosphate ($NaH_2PO_4$) solution and acidified to a pH of approximately 2.0 with phosphoric acid. The penicillin is extracted from this solution with 30 ml. of ether in three portions. The ether is chilled and filtered to remove the water crystals.

The ether solution is then placed in a small (125 ml.) flask and evaporated at reduced pressure to a volume of approximately 10 ml. To this concentrated solution is added 10 ml. of cold acetone containing approximately 1.5% by weight of water. An excess of 10% triethylamine solution in ether is then added until the solution is alkaline to moist pH paper. The solution is diluted with ether until a barely perceptible cloudiness appears in the solution. The mixture is then seeded with crystals of the triethylamine salt of penicillin G and allowed to stand overnight at room temperature. A small quantity of substantially pure crystals appear on the bottom of the flask the following morning. At intervals during the following day, small additions of ether are made to the flask. As soon as the turbidity from one addition has cleared, due to crystal formation, another portion of ether is added and this is continued until no further cloudiness forms. The mixture is then placed in a refrigerator and allowed to stand overnight. The volume of liquid is approximately 80 ml.

The resulting crystals are separated from the mother liquir by filtration and are washed with cold acetone containing approximately 1.5% by weight of water. The yield of crystals is 57 mg. and they assay 1345 Oxford units per mg., which is a total of 77,000 units and is 28% of the original amount.

*Example 3.*—A mixture of crude commercial calcium and sodium salts of penicillin equivalent to a total of 1,370,000 Oxford units, assaying approximately 300 units per mg., is dissolved in 400 ml. of 0.1 M sodium phosphate buffer solution having a pH of approximately 7.0. The solution is cooled to 2° C., acidified with phosphoric acid to a pH of approximately 2.0 and extracted with three portions of ether totalling 400 ml. The ether is then dried by freezing and removing the ice crystals by filtration.

To the dried ethereal solution is added drop by drop over the course of several hours a 10% by weight solution of triethylamine in ether until 1.5 ml. of the solution has been added. The flask is allowed to stand overnight in a refrigerator and the ether layer is decanted from the brown-colored oil and treated with additional triethylamine solution. The oil which separates on the walls of the flask soon crystallizes into clusters of colorless needles. The crystals on the bottom of the flask are admixed with a small proportion of the brown oily impurities. Triethylamine solution is then added until no further crystals are observed to form. The crystals are separated by filtration, washed with cold acetone containing 1.5% by weight of water, rinsed with ether and dried in a vacuum desiccator. The yield of crystals of the triethylamine salt of penicillin G is 295 mg.

The acetone washings are diluted with such a quantity of ether until a slight turbidity appears in the liquid. The mixture is placed in a refrigerator and allowed to stand therein overnight. The crystals which separate are removed by filtration, washed with acetone containing 1.5% by weight of water, and dried. The yield of crystals thus recovered is 90 mg. The total combined yield is 385 mg. The crystals assay approximately 1480 Oxford units per mg. and represent a total of approximately 570,000 units or approximately 42% of the original amount.

*Conversion of triethylamine salt to sodium salt.*—To a solution containing 0.980 gram of triethylamine salt of penicillin G assaying 1450 Oxford units per mg. dissolved in 100 ml. of water is added 50 ml. of 0.2 M sodium dihydrogen phosphate ($NaH_2PO_4$) solution. The solution is cooled to 0° C., acidified to a pH of 2.0 with phosphoric acid, and extracted with 200 ml. of ether in two portions. The ethereal solution is dried by freezing, filtered, and extracted with 22 ml. of 0.1 N sodium hydroxide solution in three separate portions. The pH of the combined aqueous extract is 6.8 and the total volume is 22.4 ml. The sodium hydroxide extract is frozen and dried under vacuum in the conventional manner.

The combined weight of lyophilized sodium salt of penicillin G as thus obtained is 0.791 gram, which is 92% of the theoretical stoichiometrical yield. The product is dissolved in 90% n-butanol (10% water), anhydrous n-butanol is added and the interior walls of the flask are scratched to induce crystallization. The material is placed in a refrigerator and allowed to crystallize overnight. The crystals are removed by filtration, washed with anhydrous n-butanol and then with ether. The melting point of the crystals of sodium salt of penicillin G as thus purified is 214.7°–215.0° C. The crystals assay 1630 Oxford units per mg.

*Example 4.*—The penicillin from the broth of a submerged fermentation of corn-steep liquor with a *Penicillium chrysogenum* culture known as Minnestota strain X1612 is extracted in turn with Sharples "Pent-Acetate" (90% mixed acetate esters of isomeric amyl alcohols and 10% mixed isomeric amyl alcohols), aqueous phosphate buffer solution, chloroform and dilute aqueous sodium hydroxide solution. One hundred (100) milliliters of this aqueous sodium hydroxide extract, which assays 15,048 Oxford units per milliliter, is acidified with phosphoric acid to a pH of 2.3 and extracted with 100 ml. of Sharples "Pent-Acetate." The "Pent-Acetate" extract is frozen and the ice crystals are removed therefrom.

To the dried extract thus obtained is added anhydrous triethylamine until sufficient brown-colored oil has separated. The clear solution is then separated from the oil, additional triethylamine is added and the mixture is placed in a refrigerator to stand overnight.

On the following day the crystals are separated from the mixture by filtration, washed with 1,4-dioxane and dried in a vacuum desiccator. Approximately 216.9 milligrams of crystals, assaying 1353 Oxford units per milligram, are obtained. This represents a recovery of 293,600 units or approximately 19.5% of the penicillin originally present in the sodium hydroxide extract, as the triethylamine salt of penicillin G.

The penicillin obtained by fermentation with the X1612 strain of *Penicillium chrysogenum* contains less penicillin G and more of the other penicillins than that obtained from *Penicillium notatum* N. R. R. L. No. 832.

Inasmuch as the foregoing specification comprises preferred embodiments of the invention it is to be understood that the invention is not restricted thereto and that modifications and variations may be made therein in conventional manner without departing substantially from the invention or the scope of the appended claims.

I claim:

1. A crystalline triethylamine salt of penicillin G.

2. A process for the recovery and purification of penicillin G which comprises adding triethylamine to a substantially anhydrous solution of the crude penicillin G in ether, separating precipitated impurities, crystallizing the triethylamine salt of penicillin G from the resulting solution and subsequently separating the crystals of the triethylamine salt of penicillin G and converting said salt to penicillin G by treatment with a mineral acid.

3. A process for the recovery and purification of penicillin G which comprises adding triethylamine to a substantially anhydrous solution of the crude penicillin G in amyl acetate, separating precipitated impurities, crystallizing the triethylamine salt of penicillin G from the resulting solution and subsequently separating the crystals of the triethylamine salt of penicillin G and converting said salt to penicillin G by treatment with a mineral acid.

4. A process for the recovery and purification of penicillin G which comprises adding an excess of triethylamine to a solution of the crude penicillin G in a mixture of ether and aqueous acetone until the solution is alkaline, diluting the solution with ether until cloudiness is barely perceptible, crystallizing the triethylamine salt of penicillin G from the resulting solution while maintaining the impurities in solution and subsequently separating the crystals of the triethylamine salt of penicillin G and converting said salt to penicillin G by treatment with phosphoric acid.

5. A process for the recovery and purification of penicillin G which comprises adding triethylamine to a substantially anhydrous solution of the crude penicillin G in a solvent selected from the group of ether, methyl isobutyl ketone, amyl acetate and methyl amyl acetate and forming the triethylamine salt of penicillin G, separating precipitated impurities, crystallizing the triethylamine salt of penicillin G from the resulting solution and subsequently separating the crystals of the triethylamine salt of penicillin G.

NEIL E. RIGLER.

(References on following page)

REFERENCES CITED

The following references are of record in the file of this patent:

UNITED STATES PATENTS

| Number | Name | Date |
|---|---|---|
| 2,132,662 | Volwiler | Oct. 11, 1938 |
| 2,144,552 | Shonle | Jan. 17, 1939 |
| 2,215,940 | Shonle | Sept. 24, 1940 |
| 2,220,692 | Tabern | Nov. 5, 1940 |
| 2,278,499 | Smith | Apr. 7, 1942 |
| 2,317,012 | Woodruff | Apr. 20, 1943 |
| 2,396,477 | Stiller | Mar. 12, 1946 |

FOREIGN PATENTS

| Number | Country | Date |
|---|---|---|
| 558,320 | Great Britain | Dec. 1943 |

OTHER REFERENCES

Abraham, British Journal of Experimental Pathology, vol. 23, June 1942, pp. 103–122.

Hayden Chemical Co., Discovery Report H-11 1 May 22, 1944, 2 pp.

Heyden Report, H-13, Oct. 15, 1945, page 4.